United States Patent
Stephenson et al.

(10) Patent No.: US 7,312,152 B2
(45) Date of Patent: Dec. 25, 2007

(54) LACTATE-CONTAINING CORROSION INHIBITOR

(75) Inventors: Adam R. Stephenson, Gilbert, AZ (US); Hue D. Chiang, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/879,462

(22) Filed: Jun. 28, 2004

(65) Prior Publication Data

US 2005/0287808 A1 Dec. 29, 2005

(51) Int. Cl.
*H01L 21/84* (2006.01)
*H01L 21/00* (2006.01)
*H01L 21/461* (2006.01)
*H01L 21/302* (2006.01)

(52) U.S. Cl. .............. 438/688; 438/689; 438/149; 438/155; 438/725; 257/E21.29; 257/E27.131; 257/E27.132

(58) Field of Classification Search ............ 438/30, 438/99, 149, 151, 587, 687, 688, 717, 720, 438/742, 780, 924, 945, 950, 976
See application file for complete search history.

(56) References Cited

U.S. PATENT DOCUMENTS

| | | | |
|---|---|---|---|
| 5,350,484 A | * | 9/1994 | Gardner et al. ........... 438/669 |
| 5,935,278 A | * | 8/1999 | Ishitobi et al. ........... 51/306 |
| 6,380,006 B2 | * | 4/2002 | Kido ........... 438/149 |
| 6,656,535 B2 | * | 12/2003 | He et al. ........... 427/449 |
| 2001/0032829 A1 | * | 10/2001 | Honda et al. ........... 216/108 |
| 2001/0053570 A1 | * | 12/2001 | Kido ........... 438/149 |
| 2003/0089891 A1 | * | 5/2003 | Andreas ........... 252/500 |
| 2003/0092258 A1 | | 5/2003 | Leng |
| 2004/0096778 A1 | | 5/2004 | Yates |

FOREIGN PATENT DOCUMENTS

| EP | 0875926 A | 11/1998 |
|---|---|---|
| EP | 1389746 A | 2/2004 |

OTHER PUBLICATIONS

Patent Abstracts of Japan, vol. 16, No. 125 (P-1331), Mar. 30, 1992 & JP 03291655, Dec. 10, 1991, Abstract.

* cited by examiner

*Primary Examiner*—Walter Lindsay, Jr.
*Assistant Examiner*—Mohsen Ahmadi
(74) *Attorney, Agent, or Firm*—Blakely, Sokoloff, Taylor & Zafman LLP

(57) ABSTRACT

The corrosion of aluminum-based metal films may be minimized by applying a lactate-containing solution to the aluminum-based metal films before the aluminum-based metal films are etched. The lactate-containing solution is applied to the aluminum-based metal film before the film is etched with a corrosive etchant. Minimizing the corrosion of the aluminum-based film may increase the yield and performance of the highly reflective pixel arrays that are formed from the aluminum-based metal for use in liquid crystal on silicon (LCOS) microprocessors for digital televisions.

9 Claims, 3 Drawing Sheets

LACTATE-CONTAINING CORROSION INHIBITOR

BACKGROUND OF THE INVENTION

1. Field of the Invention

The present invention relates to the field of a liquid crystal pixel array on a microprocessor and more particularly to a process of preventing corrosion of the metal pixel array.

2. Discussion of Related Art

Silicon-based microprocessors that are used to create and project images for digital high definition televisions (HDTV) have an array of highly reflective metal pixels formed over a monocrystalline silicon substrate. Liquid crystal is encased over the pixels. This is called liquid crystal on silicon (LCOS) display technology for digital televisions because the liquid crystal projects an image formed by input from the metal pixels that are controlled by the microprocessor formed of transistors manufactured in a layer beneath the pixel array on the surface of the silicon substrate.

The highly reflective metal pixels are formed of an aluminum or an aluminum and copper alloy film that has been etched. An aluminum or aluminum/copper alloy film is formed on a silicon wafer. A pattern for the etching is formed with a photoresist material that has been irradiated through a mask to form the patterns and the photoresist is then developed. The photoresist pattern serves as a mask when the metal film is etched. The metal film is etched with a chlorine plasma etchant that severely corrodes the aluminum or aluminum/copper film. The corrosion is caused by the combination of the chlorine in the etchant with air that form hydrochloric acid. The corrosion may form peaks that are above 1 micron high and may also distort and destroy the metal film. After etching an aluminum/copper alloy film into a pixel array, the pixel array is cleaned with a polymer removal chemical that may contain ethylene glycol to remove the polymer-based photoresist. Such polymer removal chemicals containing ethylene glycol causes pitting corrosion of the aluminum/copper alloy film. FIG. 1 illustrates a silicon substrate 100 on which an array of metal pixels 110 has been formed from a thin aluminum copper alloy layer 120 by the method described above. Corrosion peaks 130 and metal pitting corrosion 140 within the grain boundaries of the metal pixels 110 result, as described above.

The corrosion of the aluminum/copper alloy pixel array degrades the yield and performance of the LCOS microprocessors used in digital televisions. This is because the pixels must be highly reflective to work properly. Also, the planarity of the pixels is necessary for device performance and to permit the placing of a glass lid over the pixels to create a sealed space between the pixels and the glass lid into which the liquid crystal is inserted. If there are corrosion peaks having a height of greater than the thickness of the space between the pixels and the glass lid, the glass lid will not fit properly and the liquid crystal will leak out.

DETAILED DESCRIPTION OF THE PRESENT INVENTION

Described herein are a method of preventing corrosion of an aluminum-based film by coating the film with lactate-containing solution and the substrate resulting from coating the film with the lactate-containing solution. In the following description numerous specific details are set forth. One of ordinary skill in the art, however, will appreciate that these specific details are not necessary to practice embodiments of the invention. While certain exemplary embodiments of the invention are described and shown in the accompanying drawings, it is to be understood that such embodiments are merely illustrative and not restrictive of the current invention, and that this invention is not restricted to the specific constructions and arrangements shown and described because modifications may occur to those ordinarily skilled in the art. In other instances, well known semiconductor fabrication processes, techniques, materials, equipment, etc., have not been set forth in particular detail in order to not unnecessarily obscure embodiments of the present invention.

The corrosion of aluminum-based metal films may be minimized by applying a lactate-containing solution to the aluminum-based metal films before the aluminum-based metal films are etched. The lactate-containing solution is applied to the aluminum-based metal film before the film is etched with a corrosive etchant. Minimizing the corrosion of the aluminum-based film may increase the yield and performance of the highly reflective pixel arrays that are formed from the aluminum-based metal for use in liquid crystal on silicon (LCOS) microprocessors for digital televisions.

Figure 1:
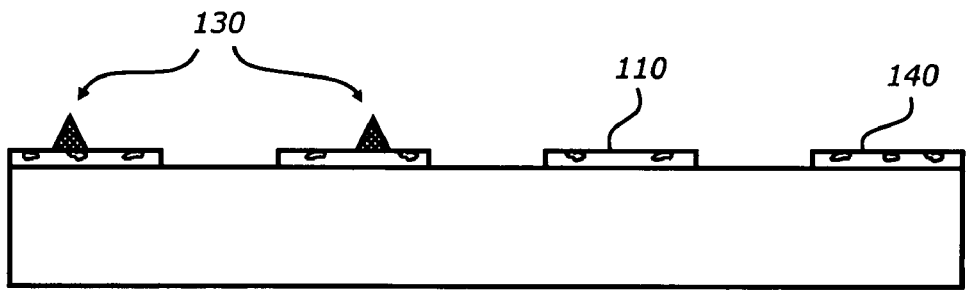
FIG. 1 is an illustration of a cross-sectional view of a prior art metal pixel array having corrosion peaks and pitting corrosion.
Figure 2A:
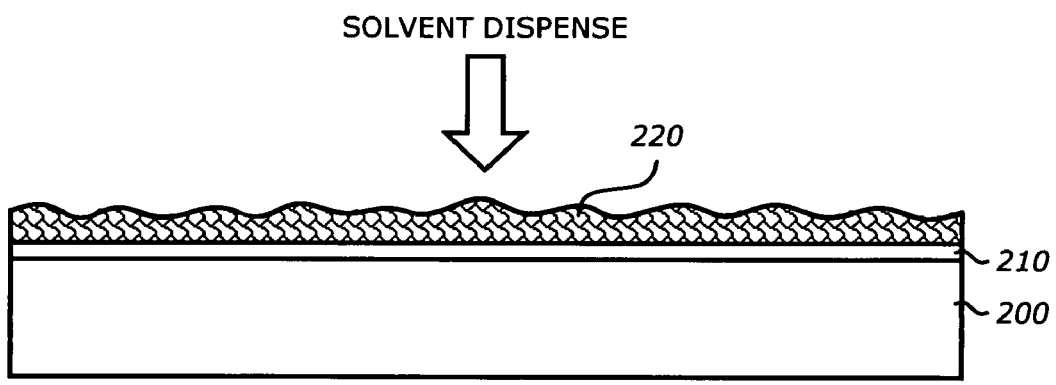
FIGS. 2a-2e illustrate cross-sectional views of a method of coating a metal film from which a metal pixel array is formed with a lactate-containing solution and subsequently forming the metal pixel array by etching.

FIG. 2a illustrates a semiconductor substrate 200 on which a thin layer of an aluminum-based metal film 210 has been formed. The semiconductor substrate 200 may be monocrystalline silicon. The aluminum-based metal film 210 may have a thickness in the approximate range of 1000 Å and 1500 Å. The aluminum-based metal film 210 may be pure aluminum or an aluminum-copper alloy. The aluminum-copper alloy may be in the approximate range of 1%-5% copper, and more particularly approximately 5% copper. The copper is added to the aluminum to prevent electromigration of the aluminum. It is valuable to have a thin aluminum-based metal film 210 to make the film 210 as reflective as possible. A lactate-containing solvent 220 is applied to the aluminum-based metal film 210 by dispensing the lactate-containing solvent 220 onto the aluminum-based metal film 210 and either letting the lactate-containing solvent 220 spread out on its own or spinning the substrate 200 to distribute the lactate-containing solvent 220. If spinning is used to distribute the lactate-containing solvent 220, the substrate 200 may be spun at a rate in the approximate range of 1200 rpm and 1700 rpm for a time in the approximate range of 1 seconds and 3 seconds. The lactate-containing solvent 220 may be ethyl lactate. Ethyl lactate is non-toxic and inexpensive. The amount of ethyl lactate applied to the aluminum-based metal film 210 may be an amount sufficient to prevent corrosion of the aluminum-based metal film 210. The lactate-containing solvent 220 is applied to the aluminum-based metal film 210 for a time sufficient for the lactate-containing solvent 220 to penetrate the grain boundaries of the aluminum-based metal film 210. Grain boundaries are the boundaries between different crystals in the aluminum-based metal film 210. Grain boundaries are often the sites on a metal where corrosion begins. It is valuable to penetrate the grain boundaries of the aluminum-based metal film 210 because the mechanism for preventing the corrosion of the aluminum-based metal film 210 may be that the lactate fills in the grain boundaries and prevents chlorine ions, water, and other aqueous contaminants from penetrating the metal grains and beginning corrosion and pitting reactions. The lactate-containing solvent 220 is then either partly or fully evaporated from the surface of the aluminum-based metal film 210. The evaporation of the lactate-containing solvent may be aided by spinning the substrate 200.

Figure 2B:
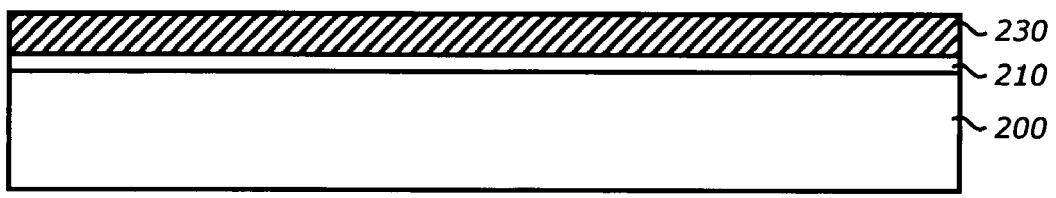
Figure 2C:
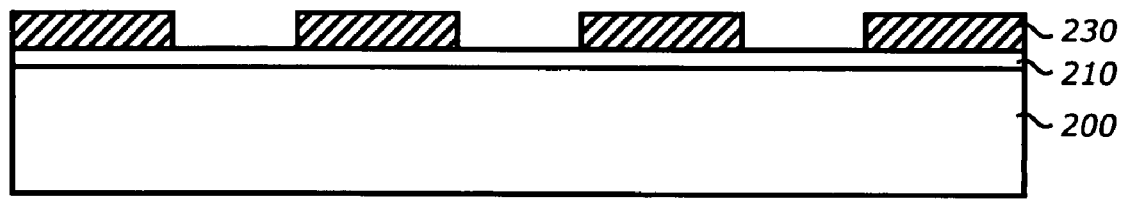
Figure 2D:
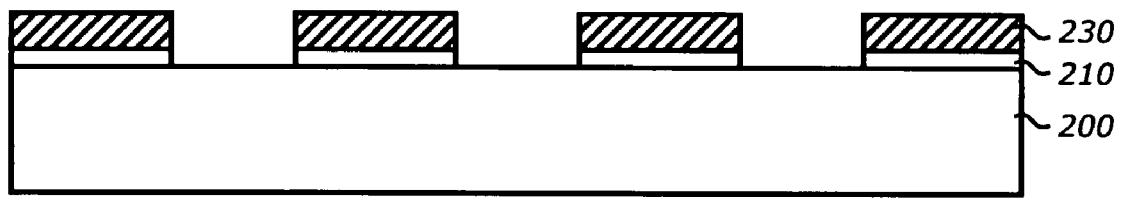
Figure 2E:
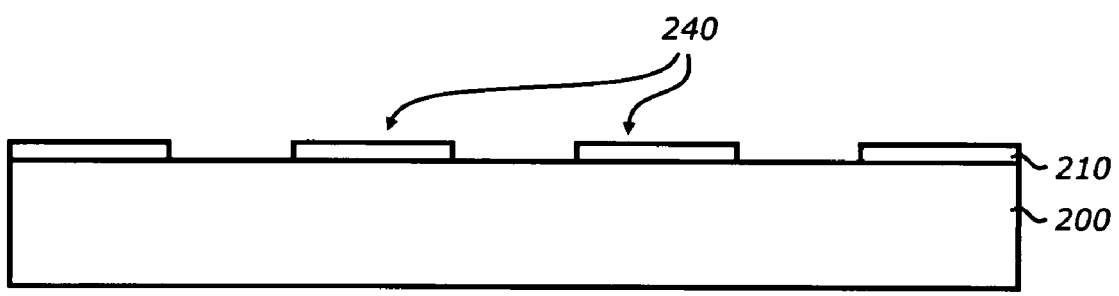

As illustrated in FIG. 2b, a photoresist 230, such as a diazonapthalquinone/Novolac type, may be deposited on the aluminum-based metal layer 210 after the lactate-containing solvent 220 has been applied to the aluminum-based metal layer 210. The photoresist 230 may be spun to the desired thickness. The photoresist may have a thickness in the approximate range of 2500 Å and 4500 Å. The amount of photoresist 230 that is used on an aluminum-based metal layer 210 that has been treated with the lactate-containing solvent 220 is less than the amount of photoresist 230 used on metal layers that have not been treated with the lactate-containing solvent by approximately 60%. The photoresist 230 is then masked and exposed to radiation to change the solubility of the photoresist 230 in the irradiated portions. The photoresist 230 is then developed to form the patterned photoresist 230 illustrated in FIG. 2c. The patterned photoresist 230 creates the pattern that will be etched into the aluminum-based metal film 210 to create the metal pixel array. The aluminum-metal based film 210 is then etched with a chlorine plasma etchant to form the structure illustrated in FIG. 2d. The chlorine plasma etchant may be formed from a plasma of a chlorine containing compound such as $BCl_3$, $BCl_4$, or $SiCl_4$. After etching the aluminum-metal based film 210, the photoresist 230 is removed by ashing the photoresist 230 in an ashing chamber. The remnants of the photoresist 230 are then removed at a wet bench using a solvent that may remove polymer-based materials such as the photoresist 230. The solvent used to remove the photoresist 230 may be one that contains ethylene glycol, Microstrip (Arch Chemicals), or EG3 (Air Products). The application of the lactate-containing solution to the aluminum-based metal film 210 may also prevent pitting corrosion by the ethylene glycol containing polymer removal chemical, or other chemical mixture, proprietary or otherwise designated for the same purpose. FIG. 2e illustrates the metal pixels 240 formed from the etched aluminum-based metal film 210 after removal of the photoresist 230. In one embodiment, the metal pixels 240 may be part of a pixel array that has 1024 pixels×768 pixels for high definition television (HDTV) microchips. On one 8 inch silicon wafer, there may be approximately 64 dies, where each die contains one pixel array of 1024×768 pixels.

Figure 3:
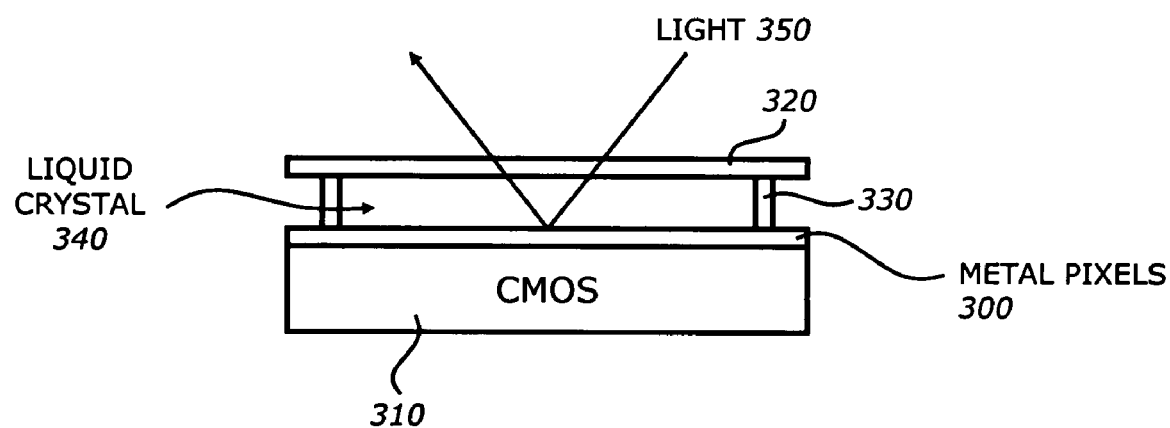
FIG. 3 illustrates a cross-sectional view of a die of a liquid crystal on silicon microprocessor.

FIG. 3 illustrates an HDTV microchip die formed of a semiconductor substrate 310 that has CMOS transistors formed in a layer beneath the metal pixel array 300. The semiconductor substrate may be a monocrystalline silicon substrate. The metal pixel array 300 may be formed of an aluminum-copper alloy. To form the HDTV microchip dies, spacers 330 are placed around each of the metal pixel arrays 300 and a glass lid 320 is placed over the spacers 330 and metal pixel arrays 300 to contain the liquid crystal 340 that has been placed over each of the metal pixel arrays 300. The thickness of the space between the glass lid 320 and the metal pixel array 300 is approximately 1 micron. After the glass lid 320 is glued in place and secured, the metal pixel arrays 300 are cut into individual dies to form the individual HDTV microchip dies, such as the one illustrated in FIG. 3. The metal pixel array 300 is highly reflective and may reflect incoming light 350.

Several embodiments of the invention have thus been described. However, those of ordinary skill in the art will recognize that the invention is not limited to the embodiments described, but can be practiced with modification and alteration within the scope and spirit of the appended claims that follow.

We claim:

1. A process, comprising:
    forming an aluminum based metal film having a grain boundary on a substrate;
    dispensing a lactate-containing solution on the aluminum based metal film, the lactate-containing solution spreading out or being distributed to penetrate the grain boundary, dispensing the lactate-containing solution comprising dispensing an ethyl lactate on the aluminum-based metal film and spinning the substrate to distribute the ethyl lactate over the aluminum based metal film; and
    etching the aluminum based metal film after dispensing the lactate-containing solution on the aluminum based metal film to form a metal pixel array.

2. The process of claim 1, further comprising evaporating the lactate-containing solution from the aluminum based metal film.

3. The process of claim 1, wherein dispensing the lactate-containing solution on the aluminum based metal film comprises filling at least one grain boundary of the aluminum based metal film with the lactate-containing solution.

4. The process of claim 1, wherein etching the aluminum-copper alloy film comprises etching the aluminum-based metal film with a chlorine plasma etchant.

5. The process of claim 1, wherein etching comprises dispensing a photoresist on the aluminum-based metal film.

6. The process of claim 5, wherein dispensing the photoresist comprises:
    dispensing the photoresist having thickness in a range from 2500 Å to 4500 Å.

7. The process of claim 1, wherein spinning the substrate comprises:
    spinning the substrate at a rate in a range of approximately 1200 rpm and 1700 rpm.

8. The process of claim 1, wherein forming the aluminum based metal film comprises:
    forming the aluminum based metal film having a thickness in a range from 1000 Å to 1500 Å.

9. The process of claim 1, wherein the aluminum-based metal film includes pure aluminum or an aluminum-copper alloy having approximately 1% to 5% copper.

* * * * *